(No Model.) 3 Sheets—Sheet 1.
W. McCALL & J. V. DE VRY.
CABLE RAILWAY.
No. 286,044. Patented Oct. 2, 1883.
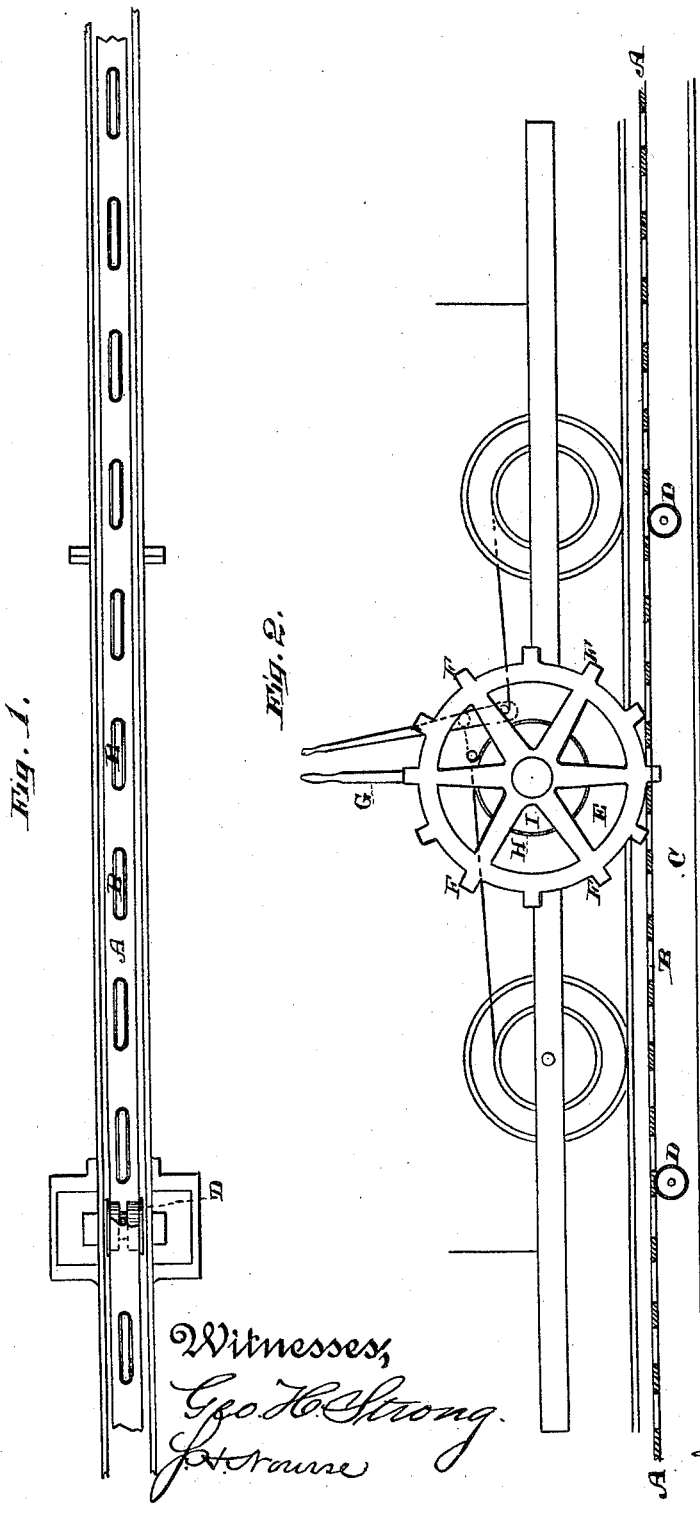

(No Model.) 3 Sheets—Sheet 2.
W. McCALL & J. V. DE VRY.
CABLE RAILWAY.
No. 286,044. Patented Oct. 2, 1883.
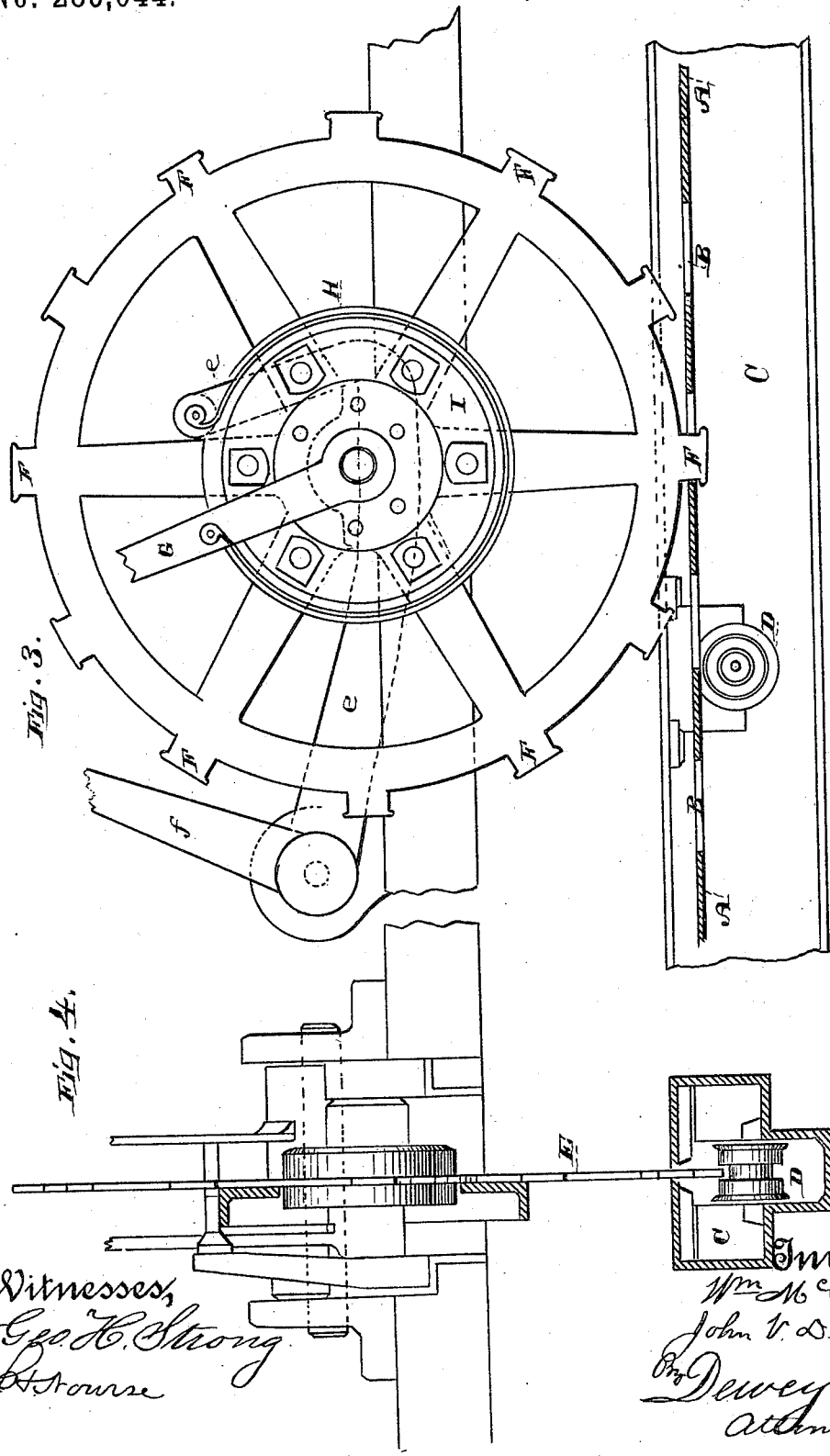
Witnesses,
Geo. H. Strong
J H Trouse
Inventor,
Wm McCall
John V. De Vry
By Dewey & Co.
Attorneys

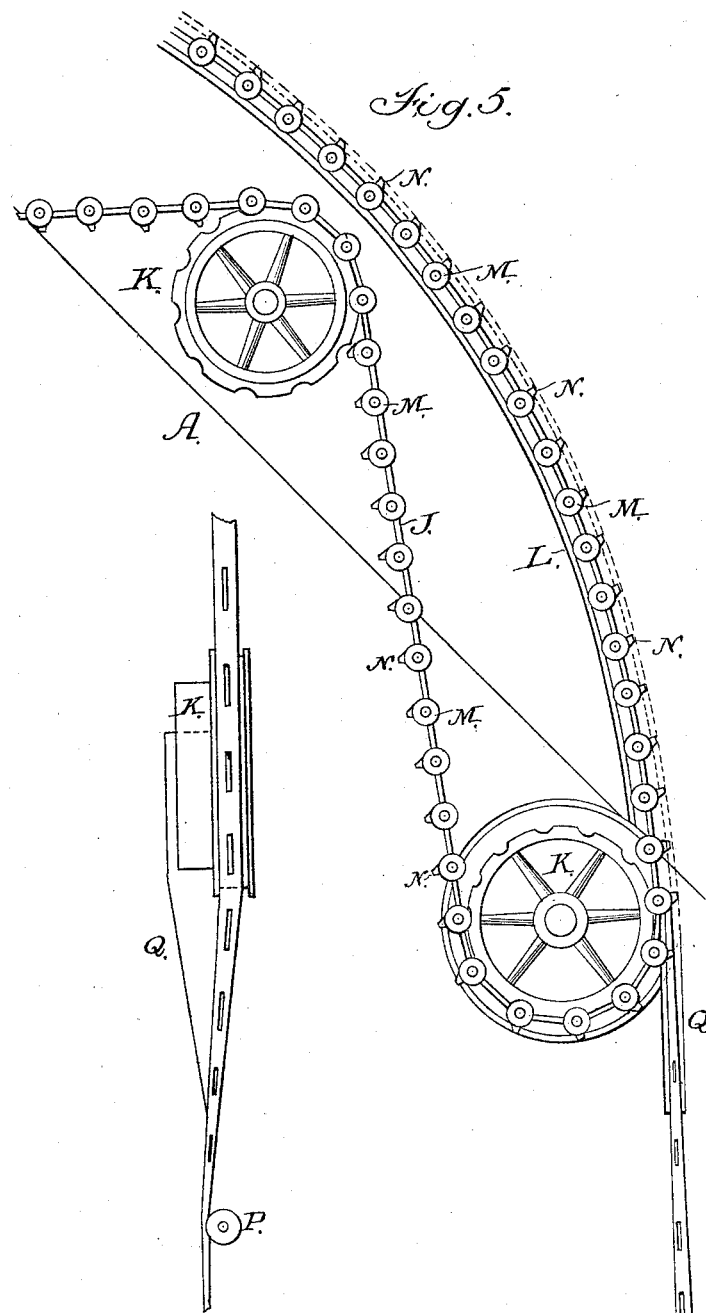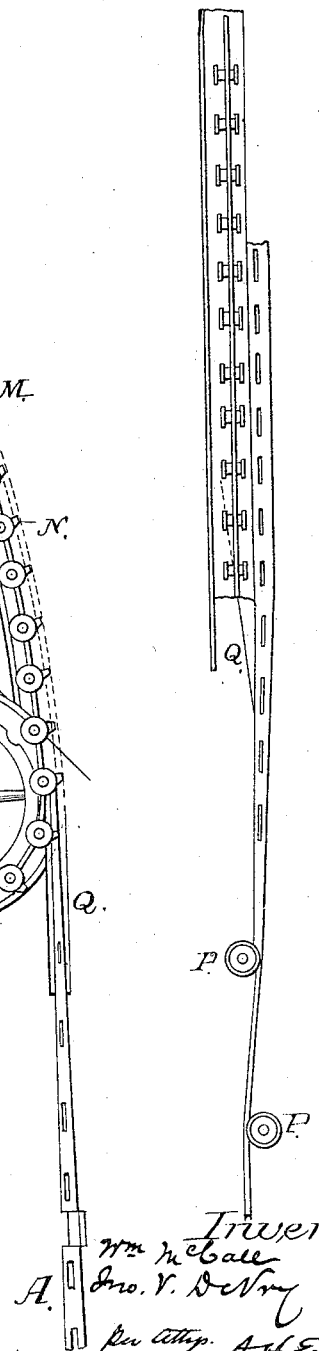

UNITED STATES PATENT OFFICE.

WILLIAM McCALL AND JOHN V. DE VRY, OF SAN FRANCISCO, CALIFORNIA.

CABLE RAILWAY.

SPECIFICATION forming part of Letters Patent No. 286,044, dated October 2, 1883.

Application filed September 18, 1882. (No model.)

*To all whom it may concern:*

Be it known that we, WILLIAM McCALL and JOHN V. DE VRY, of the city and county of San Francisco, State of California, have invented an Improvement in Cable Railways; and we hereby declare the following to be a full, clear, and exact description thereof.

Our invention relates to certain improvements in cable railways; and it consists in the combination of an improved cable and a means for connecting it with the car, and also in a means for passing curves in the road, together with certain details of construction, all of which will be more fully explained by reference to the accompanying drawings, in which—

Figure 1 is a top view of the chain. Fig. 2 is a side sectional view, showing also car. Figs. 3 and 4 are enlarged views of tube, chain, and wheel. Fig. 5 shows the arrangement for turning curves. Fig. 6 is a side elevation of part of curve.

A is our cable, which is made flat, and has wrought-iron or steel eyes or elongated loops B, so formed that they may be worked in at regular intervals in the manufacture of the cable. These eyes provide openings into which the arms of the grip or wheel, which is adjustably mounted upon the car, project to make connection between the car and the cable, as will be more fully explained hereinafter.

The cable is driven by a stationary engine and pulleys from some suitable point, and runs in an underground tube or tunnel, C, as shown. It may be made of any suitable width, so as to be strong enough for the work to be done, and is supported at intervals by pulleys D, so formed as to support its edges and leave the central portion clear for the arms of the grip to pass through the eyes B without striking the rollers, as shown in Fig. 2. Wherever there is a change of direction to a steeper grade, similar pulleys are fixed above the edges of the cable to prevent its being lifted up against the top of the tube by the strain upon it. These top pulleys must be supported by axles from either side, so as to leave the space between them free and open for the passage of the grip-arms, instead of having an axle extending entirely through both.

This cable and the means for supporting it allow the use of a much smaller tube than is necessary with the ordinary round cable, as well as from the fact that there is no bulky gripping apparatus to move inside the tube.

In order to connect the car with the cable, so that it may be propelled along the line of the track, a wheel, E, is suitably journaled upon one end of a frame, e, which extends nearly or quite horizontally to a short distance from the journals of the wheel, where it is itself journaled to the car-frame, so that the end which supports the wheel may be elevated or depressed, and thus raise the wheel or lower it, as may be desired. This raising and lowering of the wheel may take place at any point where the wheel is to be disengaged from the cable, and is especially done at the commencement of curves, as will be described hereinafter. A lever, *f*, serves to raise and lower the wheel and frame when desired; or it may be done automatically without the lever. The wheel stands in a vertical position, so that the edge of its rim may enter the slot in the roadway. Short stout arms F project radially from the rim, and are separated a distance equal to that between the eyes B in the cable. These arms enter the eyes as the cable moves, and when the car is stationary upon the track the movement of the cable causes the wheel to rotate.

When it is desired to have the car move, the lever G is thrown forward and acts upon a strap-brake, H, which encircles a drum, I, secured to the same shaft with the wheel E, and when the friction is increased sufficiently the wheel will gradually cease rotating and the car begin to move. Motion is thus gradually imparted to the car and increases until the wheel ceases to revolve, when the car will be propelled at the full speed of the cable. By throwing the lever back and relaxing the band upon its driver, the wheel will be left free to rotate and the car will come to a standstill.

By this device the car is started gradually, and no abrubt or sudden strain is brought upon the cable. The latter is also relieved from the friction and rapid wear due to the use of compression-grips, and will thus last much longer.

For the purpose of turning curves we employ an independent chain, J, which is formed of links, and passes around suitable horizontal drums, K, and is led around the curve by guide-rails L. The links of the chain have rollers M attached to them, and these rollers are fitted to run upon the guide-rails, so as to pass the chain smoothly around the curve. Spurs N are fixed to the chain so as to project horizontally outward, these spurs being separated a distance equal to that between the eyes B of the main chain, so that they may be engaged by the projecting arms F of the wheel E whenever a car arrives at this point, and they will thus move the car around the curve. The main chain is depressed by pulleys P just before reaching the curve, so as to be below the line of the teeth of the wheel E, and it makes a quarter-turn, so as to stand vertically edgewise and pass around the pulley K, by which its direction is changed. An inclined plane, Q, is fixed at a point just before the open chain is disengaged from the car, and this elevates the wheel E, so that its arms will not strike the spurs N at an angle or sidewise as they leave the main cable and arrive at the point where the chain passes around the drum K. The wheel is dropped from the incline, however, when it arrives at a point opposite the center of the drum K, or so as to travel in a line with the chain J, when it will be in position to engage the spurs N properly. By this device a car may be moved at any desired rate of speed around the curve, not exceeding that of the cable, and it may be stopped at any point or started with facility. The chain J is driven by the drums K, and these are moved by the cable A, which passes around them below the level at which it runs in the other portion of the tube, so that the arms F of the wheel E will transfer themselves from the eyes of the cable to the spurs of the chain without any attention whatever. In passing from its usual course along the tube to the drum K, by which the change of direction is made, the flat cable makes a quarter turn or twist, so that its flat side lies against the drum, and it moves around the curve with the edges up and down or in a vertical position. The chain J follows the line of the curve in the direction in which the car is to travel, and after passing around the drum K at the end is returned behind the curve, as shown, passing around the idler R, which is made movable, so as to increase the tension, if there should be any necessity. In some cases it may be found advisable to carry the main cable around the curve in line with the slot and drive the spurs by engaging them directly. The arms F would then engage these spurs outside the main cable.

Having thus described our invention, what we claim as new, and desire to secure by Letters Patent, is—

1. The wheel E, having the arms F, adapted to engage the traveling slotted cable, in combination with the frame $e$, having one end hinged to the car, and the other supporting the wheel-journals, and the lever $f$, by which the wheel may be elevated or depressed, substantially as herein described.

2. The independent chain J, extending around the curve, and having the rollers M fixed to it, in combination with the guide rails or track L, upon which they travel, substantially as herein described.

3. In a cable railway, the chain J, supported and guided around the curve, as shown, and having the projections or spurs N, in combination with the wheel E, mounted upon the car which travels upon the roadway, and having the arms F projecting into the slot in the tube, so as to engage the spurs, substantially as herein described.

4. The flat perforated traveling cable A, in combination with the pulleys P, by which it is depressed out of contact with the arms of the wheel E, and the vertically-faced drum K, by which its direction and position are changed, substantially as herein described.

5. The flat perforated traveling cable A, with its depression-pulleys P, and the subsidiary chain J, having the spurs N, in combination with the inclined plane Q, by which the wheel E is lifted, substantially as herein described.

6. The wheel E, with its spurs F, to engage the perforated traveling chain A, in combination with the vertically-moving frame $e$, in which the wheel-axles are journaled, and the lever $f$, substantially as herein described.

In witness whereof we hereunto set our hands.

WILLIAM McCALL.
JOHN V. DE VRY.

Witnesses:
S. H. NOURSE,
G. W. EMERSON.